US010805874B1

(12) United States Patent
Manganiello et al.

(10) Patent No.: US 10,805,874 B1
(45) Date of Patent: Oct. 13, 2020

(54) FREQUENCY CHANNEL LOCK IN WIRELESS DATA RELAYS

(71) Applicant: Sprint Communications Company L.P., Overland Park, KS (US)

(72) Inventors: Charles Anthony Manganiello, Paola, KS (US); Amrit Kumar Chandra, Ashburn, VA (US); Jay Ronald Chernoff, Pawleys Island, SC (US); Kristian Kai Johns, Ashburn, VA (US); David Z. Sun, Broadlands, VA (US); Neehar Shrikant Kulkarni, Herndon, VA (US); Liang Li, Darnestown, MD (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/284,284

(22) Filed: Feb. 25, 2019

(51) Int. Cl.
*H04W 84/00* (2009.01)
*H04W 48/00* (2009.01)
*H04W 88/04* (2009.01)
*H04W 80/02* (2009.01)
*H04W 64/00* (2009.01)
*H04W 72/04* (2009.01)
*H04B 7/155* (2006.01)
*H04W 84/04* (2009.01)

(52) U.S. Cl.
CPC ........ *H04W 48/17* (2013.01); *H04B 7/15528* (2013.01); *H04W 64/003* (2013.01); *H04W 72/0433* (2013.01); *H04W 72/0453* (2013.01); *H04W 80/02* (2013.01); *H04W 84/047* (2013.01); *H04W 88/04* (2013.01)

(58) Field of Classification Search
CPC ... H04W 48/17; H04W 88/04; H04W 64/003; H04W 72/0453; H04W 80/02; H04W 72/0433; H04W 84/047; H04B 7/15528
See application file for complete search history.

(56) References Cited

U.S. PATENT DOCUMENTS

| 7,299,005 B1 * | 11/2007 | Yarkosky | H04B 7/15528 370/226 |
|---|---|---|---|
| 8,150,409 B2 | 4/2012 | Kim et al. | |
| 8,170,567 B2 | 5/2012 | Cai et al. | |
| 8,270,908 B2 | 9/2012 | Wang et al. | |

(Continued)

FOREIGN PATENT DOCUMENTS

WO 2008025282 A1 3/2008

*Primary Examiner* — Vinncelas Louis

(57) ABSTRACT

A wireless data relay has radio circuitry to wirelessly scan a frequency band having frequency channels. The radio circuitry attaches to a wireless network over the frequency band. The radio circuitry receives signaling from the wireless network indicating allowed frequency channels and transfers the signaling to control circuitry. In the wireless data relay, the control circuitry processes the signaling to direct the radio circuitry to use the allowed frequency channels instead of the frequency band. In response, the radio circuitry wirelessly scans the allowed frequency channels instead of the frequency band. The radio circuitry wirelessly re-attaches to the wireless communication network over the allowed frequency channels. The radio circuitry exchanges user data with the UEs. The radio circuitry exchanges the user data with the wireless network over the allowed frequency channels.

20 Claims, 8 Drawing Sheets

(56) References Cited

U.S. PATENT DOCUMENTS

| | | |
|---|---|---|
| 8,274,923 B2 | 9/2012 | Shen et al. |
| 8,660,035 B2 | 2/2014 | Zhang et al. |
| 9,867,206 B2 | 1/2018 | Zitzmann et al. |
| 2006/0098592 A1* | 5/2006 | Proctor, Jr. ......... H04W 84/047 370/315 |
| 2006/0153132 A1 | 7/2006 | Saito |
| 2011/0237268 A1* | 9/2011 | Tsuda ................ H04W 72/0433 455/450 |

\* cited by examiner

US 10,805,874 B1

FREQUENCY CHANNEL LOCK IN WIRELESS DATA RELAYS

TECHNICAL BACKGROUND

Wireless communication networks serve wireless User Equipment (UE) with mobile data services like voice calling and internet access. The wireless data networks have wireless access points that exchange data signals over the air with the wireless UEs. The wireless access points exchange this data with wireless network cores. The wireless network cores exchange the data with various other systems like the internet and media servers. Popular forms of wireless networking are Fifth Generation New Radio (5GNR) and Long Term Evolution (LTE).

The wireless communication networks are deploying wireless data relays to extend the reach of their wireless data services. The wireless data relays have internal wireless access points that serve the wireless UEs. The wireless data relays also have internal relay equipment that wirelessly attach to the wireless access points in the wireless communication networks. The wireless data relays exchange wireless data between the UEs and the wireless access points. This wireless data exchange occurs over frequency bands. Each frequency band comprises a large amount of radio spectrum like 100 megahertz or more. Each frequency band comprises frequency channels that comprise smaller amounts of radio spectrum like 10 megahertz or less.

In response to powering-up, a given wireless data relay wirelessly scans the frequency bands that are indicated in a stored Preferred Roaming List (PRL). The wireless scan detects information like signal strength and access point identifier. The wireless data relay wirelessly attaches to one or more wireless access points using frequency channels across the entire frequency band. The wireless data relay exchanges wireless data with the wireless access points using the frequency channels across the entire frequency band.

The wireless data relays generate unwanted radio interference. Moreover, the wireless data relays suffer from excessive radio interference. Unfortunately, wireless data relays do not effectively control their frequency channels to mitigate and/or avoid excessive radio interference.

TECHNICAL OVERVIEW

A wireless data relay has radio circuitry to wirelessly scan a frequency band having frequency channels. The radio circuitry attaches to a wireless network over the frequency band. The radio circuitry receives signaling from the wireless network indicating allowed frequency channels and transfers the signaling to control circuitry. In the wireless data relay, the control circuitry processes the signaling to direct the radio circuitry to use the allowed frequency channels instead of the frequency band. In response, the radio circuitry wirelessly scans the allowed frequency channels instead of the frequency band. The radio circuitry wirelessly re-attaches to the wireless communication network over the allowed frequency channels. The radio circuitry exchanges user data with the UEs. The radio circuitry exchanges the user data with the wireless network over the allowed frequency channels.

DETAILED DESCRIPTION

Figure 1:
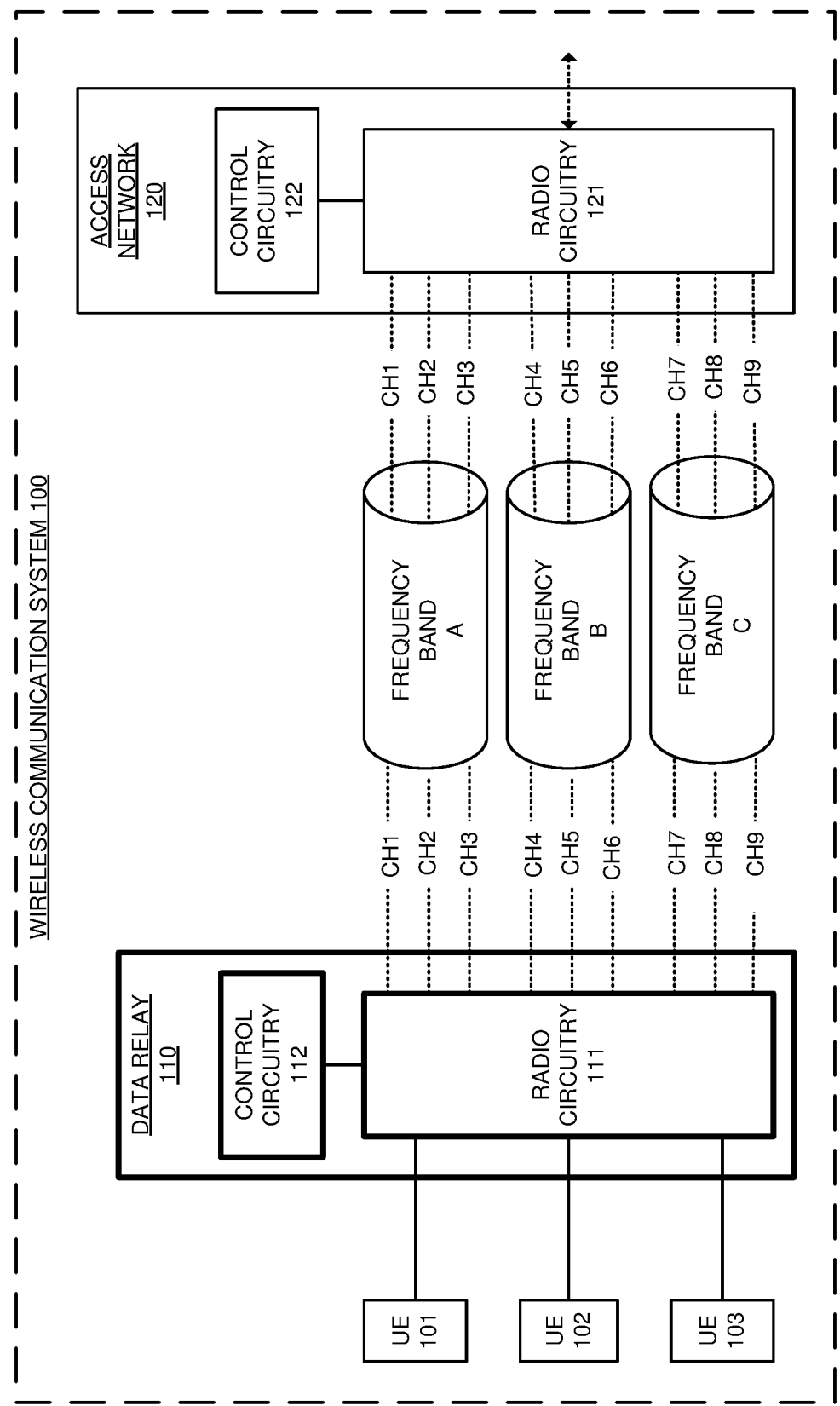
FIG. 1 illustrates a wireless communication system that controls frequency channels used by wireless data relays.
Figure 2:
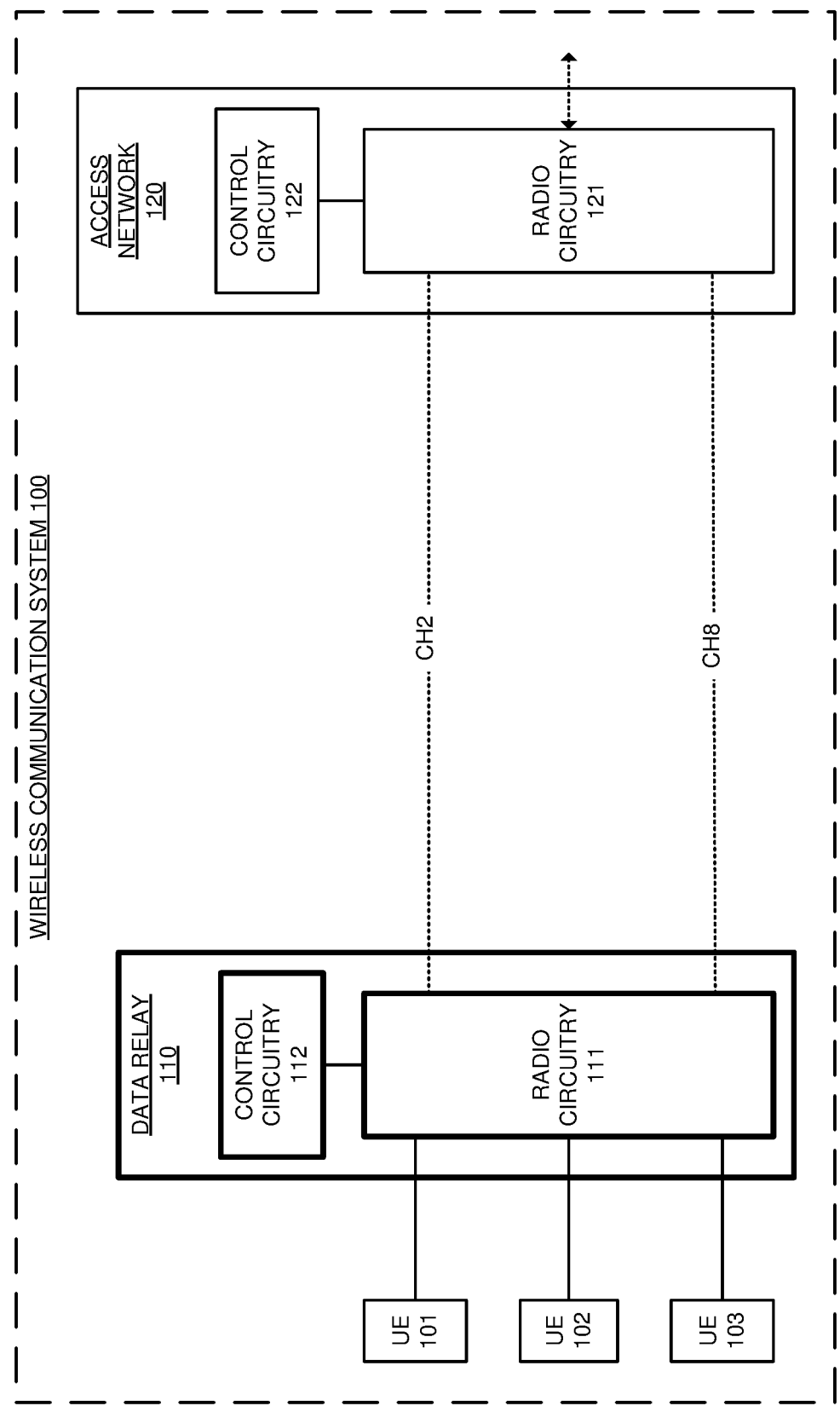
FIG. 2 illustrates the wireless communication system that controls the frequency channels used by the wireless data relays.

FIGS. 1-2 illustrate wireless communication system 100 to control the frequency channels 1-9 that are used by wireless data relay 110. Wireless communication system 100 comprises UEs 101-103, wireless data relay 110, and wireless communication network 120. Wireless data relay 110 comprises radio circuitry 111 and control circuitry 112. Wireless communication network 120 comprises radio circuitry 121 and control circuitry 122. Data relay 110 serves wireless data services to UEs 101-103. The wireless data services include internet access, voice/video calling, messaging, media streaming, machine-to-machine communications, business transactions, and/or some other over-the-air data service. Note that the number of UEs, relays, and networks that are depicted on FIG. 1 has been restricted for clarity. Wireless communication system 100 may be much larger.

UEs 101-103 could be computers, phones, displays, headsets, or some other user apparatus with wireless communication circuitry. UEs 101-103 wirelessly attach to data relay 110 over Long Term Evolution (LTE), Fifth Generation New Radio (5GNR), and/or some other wireless networking protocol. UEs 101-103 each comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems, user applications, and network applications that are stored in the memory circuitry.

In data relay 110, radio circuitry 111 uses LTE, 5GNR, or some other wireless network protocol to communicate with UEs 101-103 and with access network 120. Radio circuitry 111 comprises antennas, modulators, amplifiers, filters, digital/analog interfaces, processing circuitry, memory circuitry, firmware/software, and bus circuitry. Control circuitry 112 comprises processing circuitry, memory circuitry, bus circuitry, and software. In control circuitry 112, the processing circuitry executes operating systems and network applications that are stored in the memory circuitry.

In access network 120, radio circuitry 121 uses LTE, 5GNR, or some other wireless network protocol to communicate with data relay 110. Radio circuitry 121 comprises antennas, modulators, amplifiers, filters, digital/analog interfaces, processing circuitry, memory circuitry, firmware/software, and bus circuitry. Control circuitry 122 comprises processing circuitry, memory circuitry, bus circuitry, and software. In control circuitry 122, the processing circuitry executes operating systems and network applications that are stored in the memory circuitry. Radio circuitry 121 communicates with other network elements over backhaul circuitry like Time Division Multiplexing (TDM), Institute of Electrical and Electronic Engineers (IEEE) 802.3 (Ethernet), Internet Protocol (IP), Data Over Cable System Interface Specification (DOCSIS), Wave Division Multiplexing (WDM), LTE, 5GNR, WIFI, and/or the like. The network elements comprise an Element Management System (EMS).

Radio circuitry 111-112 exchange wireless signals over frequency bands A, B, and C. Each frequency band comprises a larger amount of spectrum like 100 megahertz or more. Frequency band A comprises frequency channels 1-3. Frequency band B comprises frequency channels 4-6. Frequency band C comprises frequency channels 7-9. Each frequency channel comprises a smaller amount of spectrum like 10 megahertz or less. The number of frequency bands may vary, and the number of frequency channels has been restricted for clarity.

Initially, data relay 110 is not wirelessly attached to access network 120. Radio circuitry 111 wirelessly scans frequency bands A, B, and C. For example, data relay 110 may be powered off and then radio circuitry 111 performs a scan in response to powering-up. The frequency bands are indicated in a Preferred Roaming List (PRL) or some other configuration data in data relay 110. The wireless scan detects information like signal strength and access point identifier.

Radio circuitry 111 wirelessly attaches to radio circuitry 121 using at least one of the frequency channels. Radio circuitry 111 transfers the wireless scan measurements and geographic location to radio circuitry 121 in access network 120. Access network 120 determines when data relay 110 should be locked to one or more frequency channels. For example, frequency channels 1, 3-7, and 9 in frequency bands A, B, and C may exhibit undue radio interference. In response, access network 120 locks data relay 110 to frequency channels 2 and 8. Radio circuitry 121 in access network 120 transfers network signaling indicating the channel lock to radio circuitry 111 in data relay 110.

The allowed frequency channels may comprise a single downlink channel and a single uplink channel. In Time Division Duplex (TDD) systems, the same channel may be used for both the uplink and downlink. The frequency channels may be designated by Evolved Universal Terrestrial Radio Access Absolute Radio Channel Numbers (EARFCNs). Thus, the allowed frequency channels may comprise a single downlink EARFCN and a single uplink EARFCN. In TDD systems, the allowed frequency channels may comprise a single uplink/downlink EARFCN.

Data relay 110 wirelessly receives the network signaling indicating the channel lock from access network 120. Radio circuitry 111 transfers the network signaling to control circuitry 112. The network signaling indicates the allowed frequency channels and/or the disallowed frequency channels. In this example, the network signaling indicates that only frequency channels 2 and 8 are allowed. The network signaling may comprise a channel lock flag and a channel list where control circuitry 112 detects the channel lock flag and responsively processes the channel list to identify the allowed frequency channels. Control circuitry 112 processes the network signaling and responsively directs radio circuitry 111 to use allowed frequency channels 2 and 8 instead of the entire frequency bands A, B, and C.

Referring to FIG. 2, radio circuitry 111 wirelessly scans only the allowed frequency channels 2 and 8 instead of the entire frequency bands A, B, and C. Radio circuitry 111 wirelessly re-attaches to the radio circuitry 121 in access wireless 120 over at least one of the allowed frequency channels 2 and 8. Radio circuitry 111 wirelessly exchanges user data with UEs 101-103. Radio circuitry 111 wirelessly exchanges the user data with radio circuitry 121 in access network 120 over one or both of the allowed frequency channels 2 and 8.

In some examples, control circuitry 112 in data relay 110 generates network signaling that indicates the allowed frequency channels 2 and 8. Control circuitry 112 transfers the network signaling to radio circuitry 112, and radio circuitry 112 transfers the network signaling to radio circuitry 121. Radio circuitry 121 then wirelessly exchanges user data with radio circuitry 111 using Carrier Aggregation (CA) over the allowed frequency channels 2 and 8. For example, frequency channel 2 may transport a primary component carrier, and frequency channel 8 may transport a secondary component carrier.

Subsequently, access network 120 determines when data relay 110 should be unlocked or relocked to other frequency channels. For example, frequency channels 1-9 in frequency bands A, B, and C may now experience minimal radio interference. In response, access network 120 unlocks data relay 110 to all frequency channels 1-9 across frequency bands A, B, and C. Access network 120 transfers network signaling indicating the channel unlock to data relay 110.

Referring back to FIG. 1, radio circuitry 111 wirelessly scans entire frequency bands A, B, and C responsive to the channel unlock instruction. Radio circuitry 111 wirelessly re-attaches to radio circuitry 121 in access wireless 120 over at least one of allowed frequency channels 1-9. Radio circuitry 111 wirelessly exchanges user data with UEs 101-103. Radio circuitry 111 wirelessly exchanges the user data with radio circuitry 121 in access network 120 over frequency channels 1-9 across the entirety of frequency bands A, B, and C.

Figure 3:
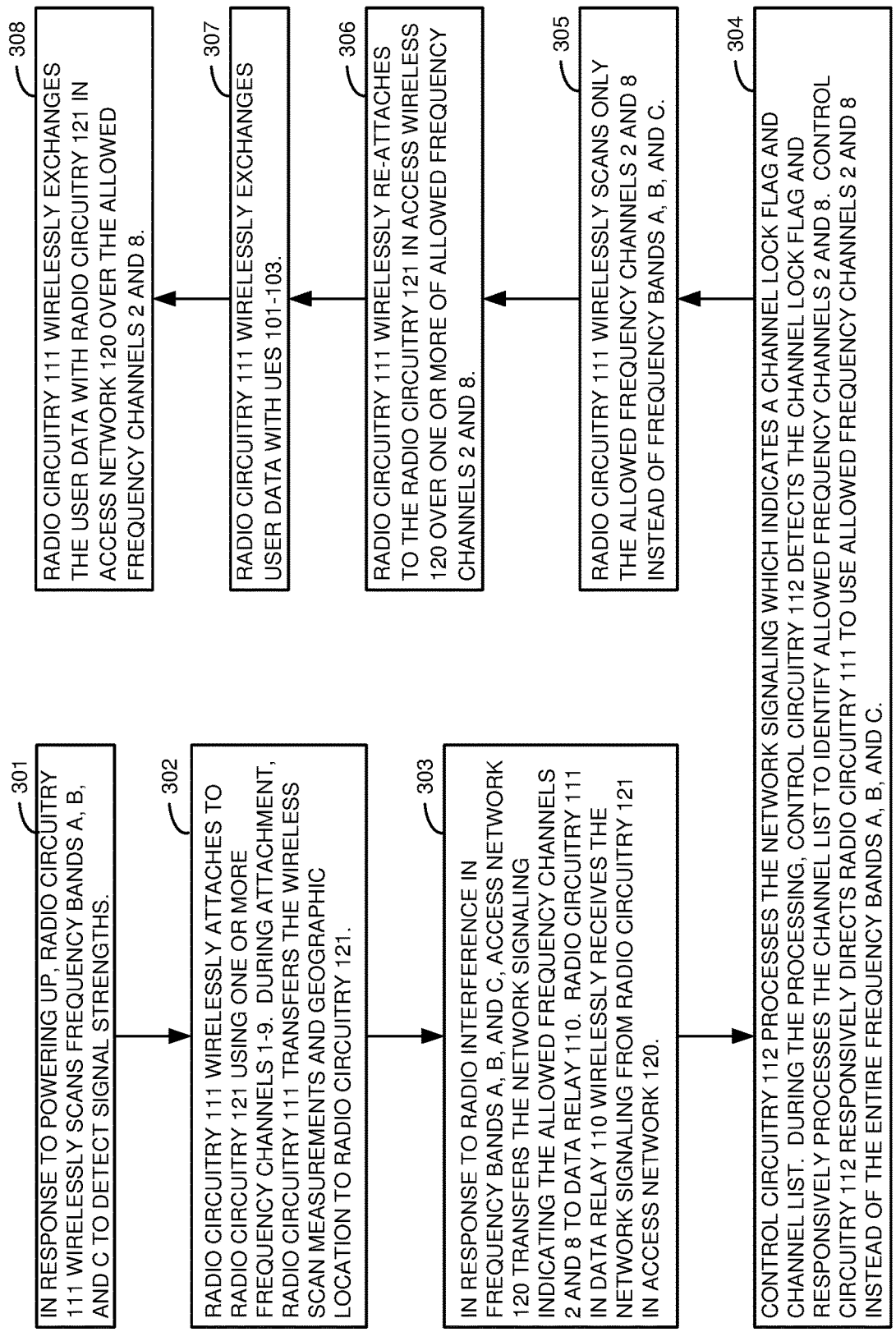
FIG. 3 illustrates the operation of the wireless communication system that controls the frequency channels used by the wireless data relays.

FIG. 3 illustrates the operation of wireless communication system 100 to control which of frequency channels 1-9 are used by wireless data relay 110. In response to powering up, radio circuitry 111 wirelessly scans frequency bands A, B, and C to detect signal strengths (301). Radio circuitry 111 wirelessly attaches to radio circuitry 121 using one or more frequency channels 1-9 (302). During attachment, radio circuitry 111 transfers the wireless scan measurements and geographic location of data relay 110 to radio circuitry 121.

In response to radio interference in frequency bands A, B, and C, access network 120 transfers network signaling indicating allowed frequency channels 2 and 8 to data relay 110 (303). Radio circuitry 111 in data relay 110 wirelessly receives the network signaling from radio circuitry 121 in access network 120. Control circuitry 112 processes the network signaling which indicates a channel lock flag and channel list (304). During the processing, control circuitry 112 detects the channel lock flag and responsively processes the channel list to identify allowed frequency channels 2 and 8. Control circuitry 112 responsively directs radio circuitry 111 to use allowed frequency channels 2 and 8 instead of the entire frequency bands A, B, and C.

Radio circuitry 111 wirelessly scans only the allowed frequency channels 2 and 8 instead of frequency bands A, B, and C (305). Radio circuitry 111 wirelessly re-attaches to the radio circuitry 121 in access wireless 120 over one or more of allowed frequency channels 2 and 8 (306). Radio circuitry 111 wirelessly exchanges user data with UEs 101-103 (307).

Radio circuitry 111 wirelessly exchanges the user data with radio circuitry 121 in access network 120 over the allowed frequency channels 2 and 8 (308). In some cases, radio circuitry 111 and radio circuitry 121 use CA over allowed frequency channels 2 and 8.

Figure 4:
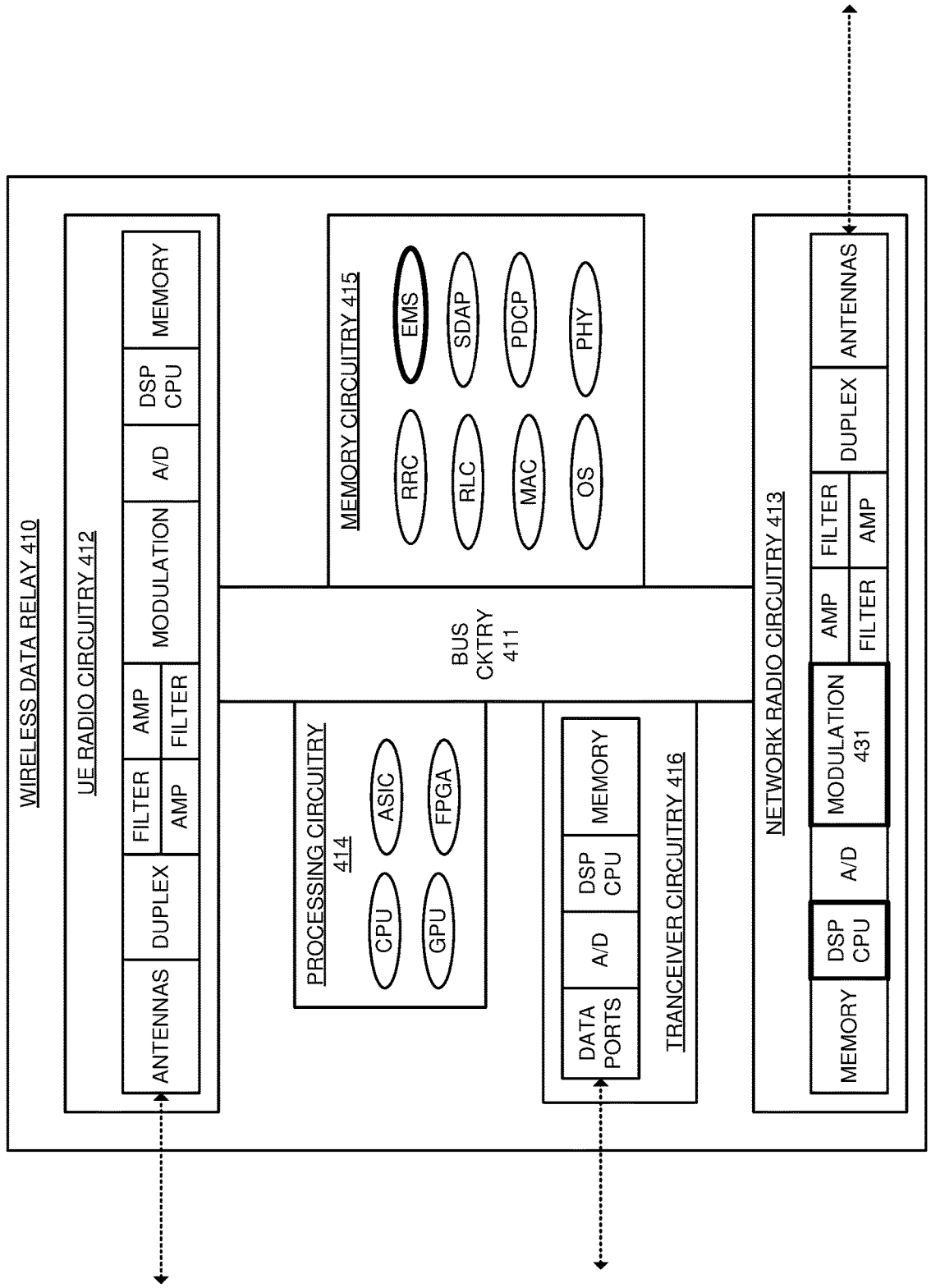
FIG. 4 illustrates a wireless data relay that controls its frequency channel usage.

FIG. 4 illustrates wireless data relay 410 that controls its frequency channel usage. Wireless data relay 410 is an example of data relay 110, although relay 110 may differ. Wireless data relay 410 comprises bus circuitry 411, radio circuitry 412-413, processing circuitry 414, memory circuitry 415, and transceiver circuitry 416. Bus circuitry 411 couples radio circuitry 412-413, processing circuitry 414, memory circuitry 415, and transceiver circuitry 416. Memory circuitry 415 comprises volatile and non-volatile memories like flash, disc, tape, and the like. Memory circuitry 415 stores an operating system (OS) and network applications like Physical Layer (PHY), Media Access Control (MAC), Radio Link Control (RLC), Packet Data Control Protocol (PDCP), Radio Resource Control (RRC), and Service Data Application Protocol (SDAP), Element Management System (EMS) application, and the like. Processing circuitry 414 comprises Central Processing Units (CPUs), Graphical Processing Units (GPUs), Application Specific Integrated Circuits (ASICs), Field Programmable Gate Array (FPGAs), or some other computer hardware. Transceiver circuitry 416 comprises memory, Digital Signal Processor (DSP)/CPU, Analog/Digital (A/D) interface, and data ports.

Radio circuitry 412-413 each comprise antennas, duplexers, filters, amplifiers, modulation, A/D interfaces, DSP/CPUs, and memory. In radio circuitry 412, the antennas exchange wireless signals with wireless UEs, and the DSP/CPUs execute firmware/software to drive the exchange of data between the antennas and memory circuitry 415. Processing circuitry 414 executes the operating system and network applications to drive the exchange of the data between radio circuitry 412-413 through memory circuitry 415. In radio circuitry 413, the antennas exchange wireless signals with wireless access points, and the DSP/CPUs execute firmware/software to drive the exchange of data between the antennas and memory circuitry 415.

The antennas in radio circuitry 412 receive wireless UL signals from UEs and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSP/CPUs. The DSP/CPUs recover UL data and signaling from the UL signals. The DSP/CPUs store the UL data and signaling in memory circuitry 415. The network applications process the UL data and signaling in memory circuitry 415. The network applications generate and store UL data and signaling in the memory of radio circuitry 413. In radio circuitry 413, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies, and these carrier frequencies may be subject to a channel lock to one or more EARFCNs. The amplifiers boost the UL signals for the filters which attenuate unwanted out-of-band energy. The filters transfer the UL signals through the duplexers to the antennas. The electrical UL signals drive the antennas to emit corresponding wireless UL signals to wireless access points.

In radio circuitry 413, the antennas receive wireless Downlink (DL) signals from wireless access points and transfer corresponding electrical DL signals through the duplexers to the amplifiers. The amplifiers boost the DL signals for filters which attenuate unwanted energy. In modulation, demodulators down-convert the DL signals from their carrier frequencies, and these carrier frequencies may be subject to frequency lock to one or more EARFCNs. The analog/digital interfaces convert the analog DL signals into digital DL signals for the DSP/CPUs. The DSP/CPUs recover DL data and signaling from the DL signals. The DSP/CPUs transfer the DL data and signaling to memory circuitry 415. The network applications transfer the DL data and signaling from memory circuitry 415 to radio circuitry 412.

In radio circuitry 412, the DSP/CPUs transfer corresponding DL signals to the analog/digital interface. The analog/digital interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to the UEs.

In wireless data relay 410, the PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms/Inverse Fast Fourier Transforms (FFTs/IFFTs), channel coding/decoding, layer mapping/de-mapping, precoding, Discrete Fourier Transforms/Inverse Discrete Fourier Transforms (DFTs/IDFTs), and Resource Element (RE) mapping/de-mapping. The MACs map between the MAC transport channels and MAC logical channels. MAC functions include buffer status, power headroom, channel quality, Hybrid Answer Repeat Request (HARQ), user identification, random access, user scheduling, and Quality-of-Service (QoS). The MACs implement QoS by the RRCs.

The RLCs map between the MAC logical channels and Protocol Data Units (PDUs). RLC functions comprise Answer Repeat Request (ARQ), sequence numbering and resequencing, segmentation and resegmentation. The RLCs exchange data and signaling with the PDCPs. The PDCPs map between the PDUs from the RLCs and Service Data Units (SDUs) for the RRCs/SDAPs. PDCP functions comprise security ciphering, header compression and decompression, sequence numbering and re-sequencing, de-duplication. The PDCPs exchange SDUs with the RRCs and SDAPs. The RRCs interact with wireless network controllers like AMFs and/or MMEs to establish and terminate data sessions. The RRCs support N1/N2 messaging with the AMFs. The RRCs handle security and key management, handover operations, status reporting, QoS, system broadcasts, and network pages. The SDAPs exchange S3 data with UPFs under the control of SMFs. The SDAPs map between the SDUs and the QoS flows and mark the QoS flows with the proper QoS.

In response to power-up, the DSP/CPU in radio circuitry 413 reads scan configuration data from the radio memory that indicates one or more frequency bands for scanning. The DSP/CPU directs the modulation circuitry to wirelessly scan the frequency band(s). The antennas receive pilot signals from wireless access points across the entire frequency band(s). Modulation circuitry 431 receives the amplified and filtered pilot signals and operates an oscillator at frequencies across the entire frequency band(s) to detect pilot signals energies and frequencies that are then digitized for the DSP/CPU. The DSP/CPU detects the pilot signals and their wireless access points represented in the digitized signal data. The DSP/CPU identifies the frequency band(s) and frequency channels that are used by the various wireless access points. The frequency channels may be designated by Evolved Universal Terrestrial Radio Access Absolute Radio Channel Numbers (EARFCNs).

The DSP/CPU in radio circuitry 413 transfers information to the RRC (through the PHY, MAC, RLC, and PDCP) that identifies the wireless access points, signal strengths, frequency band(s), and frequency channels. The RRC directs the DSP/CPU (through the PHY, MAC, RLC, and PDCP) in radio circuitry 413 to wirelessly attach to one of the wireless access points over one of the frequency bands and frequency channels. The RRC directs the DSP/CPU (through the PHY, MAC, RLC, and PDCP) to wirelessly transfer the wireless scan results to the wireless access point.

The antennas in radio circuitry 413 wirelessly receive network signaling indicating a channel lock from the wireless base station. The DSP/CPU in radio circuitry 413 decode and transfer the network signaling to the RRC (through the PHY, MAC, RLC, and PDCP). The RRC transfers EMS signaling indicating the allowed EARFCNs to the EMS application. The EMS application processes the EMS signaling to identify the allowed EARFCNs. The EMS application directs the DSP/CPU in radio circuitry 413 (through the RRC, PDCP, RLC, MAC, and PHY) to lock modulation circuitry 431 on the allowed EARFCNs and reboot radio circuitry 413. The DSP/CPU adds the lock instruction and EARFCNs to the scan configuration. The DSP/CPU then reboots.

In response to the reboot power-up, the DSP/CPU in radio circuitry 413 reads the scan configuration data from the radio memory that indicates the EARFCNs for scanning. The DSP/CPU directs modulation circuitry 731 to wirelessly scan the allowed EARFCNs. The antennas receive pilot signals from wireless access points across only the allowed EARFCNs. Modulation circuitry 431 receives the amplified and filtered pilot signals and operates an oscillator at frequencies only across the allowed EARFCNs to detect pilot signals energies and frequencies that are then digitized for the DSP/CPU. The DSP/CPU detects the pilot signals and their wireless access points represented in the digitized signal data. The DSP/CPU identifies the EARFCNs that are used by the wireless access points.

The DSP/CPU in radio circuitry 413 transfers information to the RRC (through the PHY, MAC, RLC, and PDCP) that identifies the wireless access points, signal strengths, frequency band(s), and allowed EARFCNs. The RRC directs the DSP/CPU (through the PHY, MAC, RLC, and PDCP) in radio circuitry 413 to wirelessly attach to one of the wireless access points over one of the allowed EARFCNs. The RRC directs the DSP/CPU (through the PHY, MAC, RLC, and PDCP) to wirelessly transfer the wireless scan results to the wireless access point.

The antennas in radio circuitry 413 wirelessly receive network signaling indicating a channel unlock from the wireless base station. The DSP/CPU in radio circuitry 413 decode and transfer the network signaling to the RRC (through the PHY, MAC, RLC, and PDCP). The RRC transfers EMS signaling indicating the unlock to the EMS application. The EMS application processes the EMS signaling to identify the unlock. The EMS application directs the DSP/CPU in radio circuitry 413 (through the RRC, PDCP, RLC, MAC, and PHY) to unlock modulation circuitry 431 and reboot. The DSP/CPU restores the scan configuration to scan the entire frequency bands. The DSP/CPU then reboots and the initial scanning process for the entire frequency bands is repeated.

Figure 5:
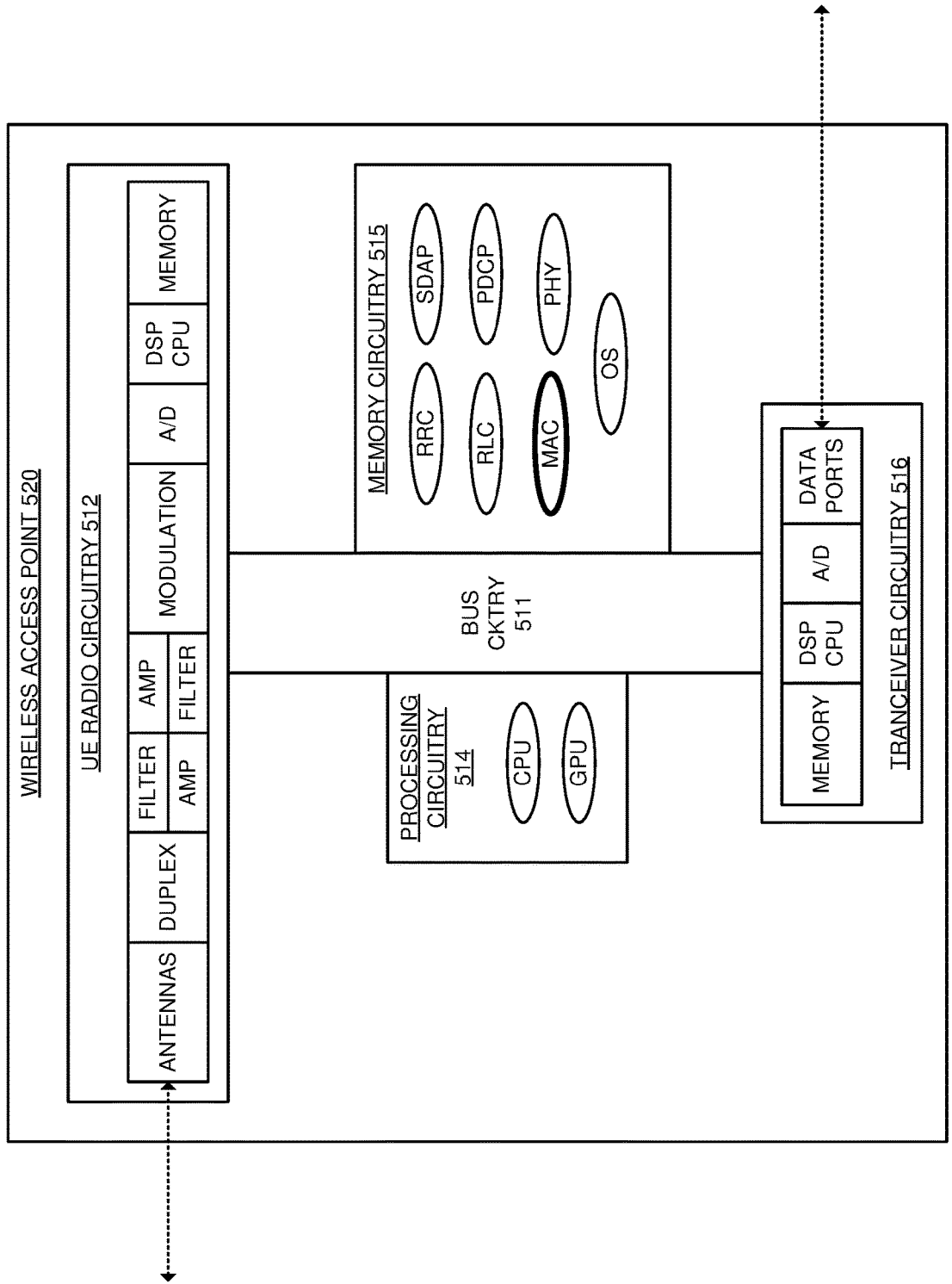
FIG. 5 illustrates a wireless access point that serves wireless data relays that control their frequency channel usage.

FIG. 5 illustrates wireless access point 520 that serves wireless data relays that control their frequency channel usage. Wireless access point 520 is an example of access network 120, although network 120 may vary. Wireless access point 520 comprises bus circuitry 511, radio circuitry 512-513, processing circuitry 514, memory circuitry 515, and transceiver circuitry 516. Bus circuitry 511 couples radio circuitry 512-513, processing circuitry 514, memory circuitry 515, and transceiver circuitry 516. Memory circuitry 515 comprises volatile and non-volatile memories like flash, disc, tape, and the like. Memory circuitry 515 stores an operating system, network applications (PHY, MAC, RLC, PDCP, RRC, SDAP), and the like. Processing circuitry 514 comprises CPUs, GPUs, or some other computer hardware. Transceiver circuitry 516 comprises memory, DSP/CPU, A/D interface, and data ports. The data ports in transceiver circuitry 516 could be wireless and/or wireline and use TDM, Ethernet, IP, DOCSIS, WDM, LTE, 5GNR, WIFI, and/or the like.

Radio circuitry 512 comprises antennas, duplexers, filters, amplifiers, modulation, analog/digital interfaces, DSP/CPUs, and memory. In radio circuitry 512, the antennas exchange wireless signals with wireless UEs, and the DSP/CPUs execute firmware/software to drive the exchange of data between the antennas and memory circuitry 515. Processing circuitry 514 executes the operating system and network applications to drive the exchange of the data between radio circuitry 512 and transceiver circuitry 516 through memory circuitry 515.

In transceiver circuitry 516, the data ports exchange user data and network signaling with other network elements. Exemplary network elements include Element Management System (EMS), User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), Mobility Management Entity (MME), Home Subscriber System (HSS), Serving Gateway (SGW), Packet Data Network Gateway (PGW), Policy Control Rules Function (PCRF), and Call State Control Function (CSCF).

The EMS manages network elements and processes interference data to control the frequency channels used by wireless data relays. The UPF routes data packets and forms an anchor point for user mobility. The UPF inspects packets and applies Quality-of-Service. The AMF manages authentication, authorization, connections, mobility, N1 signaling, ciphering, registration, and security. The SMF manages session establishment, modification, and release. The SMF handles network addressing. Dynamic Host Control Protocol (DHCP), N1 signaling, downlink notification, and traffic steering. The AUSF authenticates and authorizes users. The UDM generates user authentication credentials and supports user identification, authorization, and subscriptions. The PCF provides policy rules and decisions. The AF routes traffic and implements policy controls. The NRF enables service discovery and maintain network function profiles/ instances. The NSSF selects network slices to serve users and determine slice assistance information and AMPs. The NEF exposes capabilities and events. The NEF securely interacts with external applications and translates internal/external information. The MME manages session establishment, modification, and release. The MME also manages authentication, authorization, mobility. Non-Access Stratum signaling, ciphering, registration, and security. The HSS authenticates and authorizes users and indicates user services. The HSS also generates user authentication credentials and supports user identification and authorization. The SGW serves wireless access points, routes data packets, and applies QoS. The PGW routes data packets, handles network addressing, DHCP, forms anchor points for user mobility, inspects packets, and applies QoS. The PCRF provides policy rules and decisions. The CSCF comprises Session Initiation Protocol (SIP) servers that register UEs and control user media sessions by distributing IP addresses between UEs.

The antennas in radio circuitry 512 receive wireless UL signals from wireless UEs and wireless data relays. The antennas transfer corresponding electrical UL signals through the duplexers to the amplifiers. The amplifiers boost the UL signals for filters which attenuate unwanted energy. In modulation, demodulators down-convert the UL signals from their carrier frequencies. For some wireless data relays, the carrier frequencies may be locked to one or two EARFCNs. The analog/digital interfaces convert the analog UL signals into digital UL signals for the DSP/CPUs. The DSP/CPUs recover UL data and signaling from the UL signals. The DSP/CPUs store the UL data and signaling in memory circuitry 515. The network applications process the UL data and signaling in memory circuitry 515. The network applications transfer the UL data and signaling from memory circuitry 515 to various network elements over transceiver circuitry 516.

Transceiver circuitry 516 receive Downlink (DL) signals from the network elements and recovers DL data and signaling from the DL signals. The DSP/CPUs in transceiver circuitry 516 transfer the DL data and signaling to memory circuitry 515. The network applications transfer the DL data and signaling from memory circuitry 515 to radio circuitry 512. In radio circuitry 512, the DSP/CPUs transfer corresponding DL signals to the analog/digital interface. The analog/digital interface converts the digital DL signals into analog DL signals for the modulators. The modulators up-convert the DL signals to their carrier frequencies, and for some wireless data relays, the carrier frequencies may be locked to one or two EARFCNs. The amplifiers boost the DL signals for the filters which attenuate unwanted out-of-band energy. The filters transfer the DL signals through the duplexers to the antennas. The electrical DL signals drive the antennas to emit corresponding wireless DL signals to the wireless UEs and wireless data relays.

In wireless access point 520, the PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

The MACs map between the MAC transport channels and MAC logical channels. MAC functions include buffer status, power headroom, channel quality, HARQ, user identification, random access, user scheduling, and QoS. The MACs implement QoS as directed by the RRCs. The RLCs map between the MAC logical channels and PDUs. RLC functions comprise ARQ, sequence numbering and resequencing, segmentation and resegmentation. The RLCs exchange data and signaling with the PDCPs. The PDCPs map between the PDUs from the RLCs and SDUs for the RRCs/SDAPs. PDCP functions comprise security ciphering, header compression and decompression, sequence numbering and re-sequencing, de-duplication. The PDCPs exchange SDUs with the RRCs and SDAPs.

The RRCs interact with the EMS to aggregate signal quality and interference data and to control the EARFCNs that are used between wireless data relays and wireless access point 520. The RRCs interact with wireless network controllers like AMFs and/or MMEs to establish and terminate data sessions. The RRCs support N1/N2 messaging with the AMFs. The RRCs handle security and key management, handover operations, status reporting, QoS, system broadcasts, and network pages. The SDAPs exchange S3 data with UPFs under the control of SMFs. The SDAPs map between the SDUs and the QoS flows and mark the QoS flows with the proper QoS.

Figure 6:
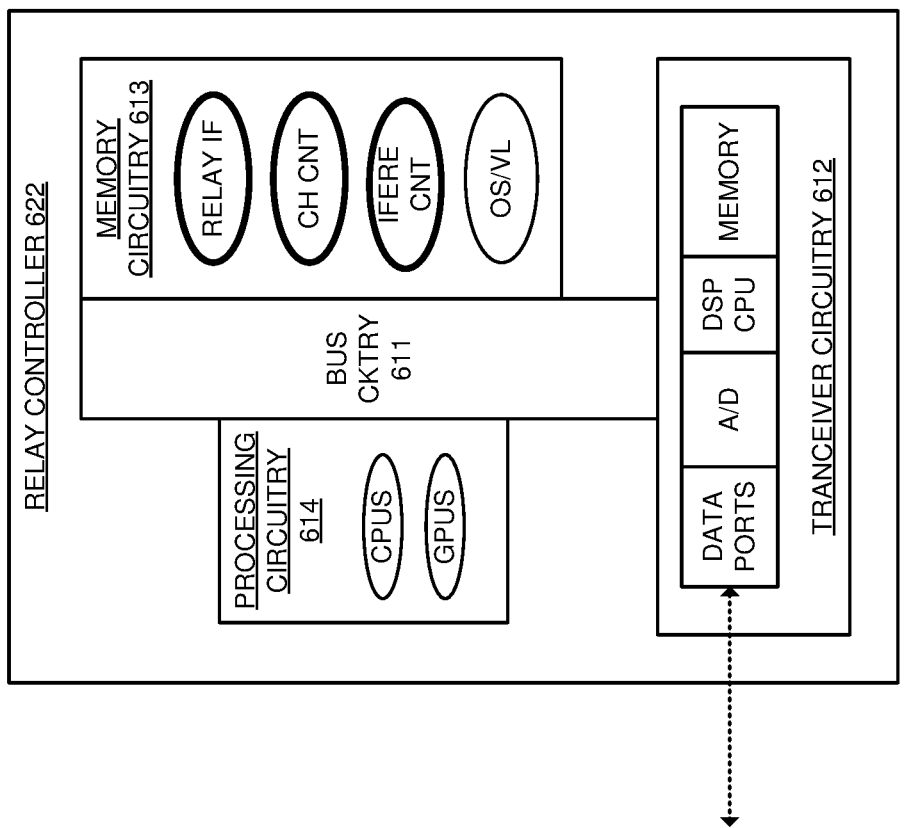
FIG. 6 illustrates a relay controller that controls frequency channels used by wireless data relays.

FIG. 6 illustrates relay controller 622 that controls the frequency channels used by wireless data relays. Relay controller 622 comprises bus circuitry 611, transceiver circuitry 612, memory circuitry 613, and processing circuitry 614. Bus circuitry 611 couples transceiver circuitry 612, memory circuitry 613, and processing circuitry 614. Memory circuitry 613 comprises volatile and non-volatile memories like flash, disc, tape, and the like. Memory circuitry 613 stores an operating system (OS), virtual layers (VL), and network applications like interference control (IFERE CNT), channel control (CH CNT), and relay interface (IF). Processing circuitry 614 comprises CPUs, GPUs, and/or some other computer hardware that executes the operating system and network applications. Transceiver circuitry 612 comprises memory, DSP, CPU, analog-to-digital interface, and data ports. The data ports in transceiver circuitry 612 communicate with network elements including wireless access points.

Processing circuitry 614 executes the operating systems to drive the hardware and support the virtual layers. Processing circuitry 614 executes the virtual layers to support the network applications. The virtual layers comprise virtual switches, virtual machines, hypervisors, and the like. In transceiver circuitry 612, the DSP/CPUs exchange network signaling with the transceiver memory. Processing circuitry 614 exchanges the network signaling between the transceiver memory and memory circuitry 613. Processing circuitry 614 executes the interference control application to aggregate radio interference data and detect excessive interference on a per EARFCN basis. Processing circuitry 614 executes the channel control application to identify wireless data relays using EARFCNs having the excessive radio interference and to select EARFCNs for the wireless data relays to mitigate and/or avoid the radio interference. In a reciprocal manner, processing circuitry 614 executes the interference and channel control applications to identify wireless data relays that could use locked EARFCNs that do not have excessive radio interference and to select locked EARFCNs in the wireless data relays to unlock or change. Processing circuitry 614 executes the relay interface application to transfer channel lock instructions and the channel unlock instructions to the wireless data relays over the wireless access points.

Figure 7:
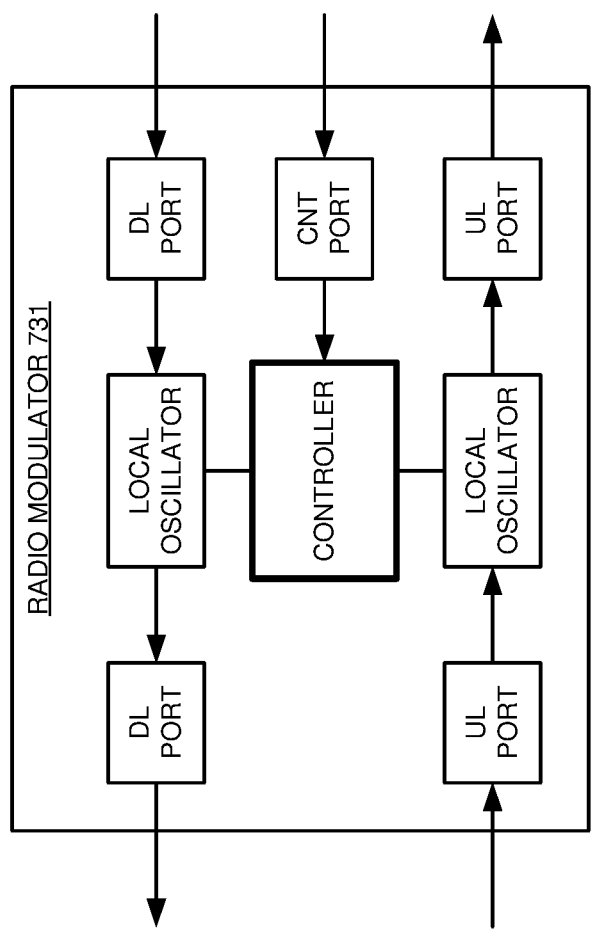
FIG. 7 illustrates a relay modulator that controls frequency channel usage.

FIG. 7 illustrates radio modulator 731 that controls the frequency channel usage in a wireless data relay. Modulator 731 comprises a controller, DL ports, UL ports, and a control (CNT) port. The control port receives frequency band and frequency channel instructions from the radio DSP/CPU and transfers the instructions to the controller. The controller translates the band and/or channel numbers from the instructions into carrier frequencies and bandwidths. The controller directs the local oscillators to use these carrier frequencies and bandwidths. The carrier frequencies may be locked to specific frequency channel numbers on the UL and/or the DL. The UL/DL ports receive input signals and transfer the input signals to their local oscillators. The local oscillators modulate the UL and demodulate the DL as directed by the controller. The UL/DL ports transfer the modulated UL signals to amplifier circuitry and transfer the demodulated DL signals to A/D circuitry.

Figure 8:
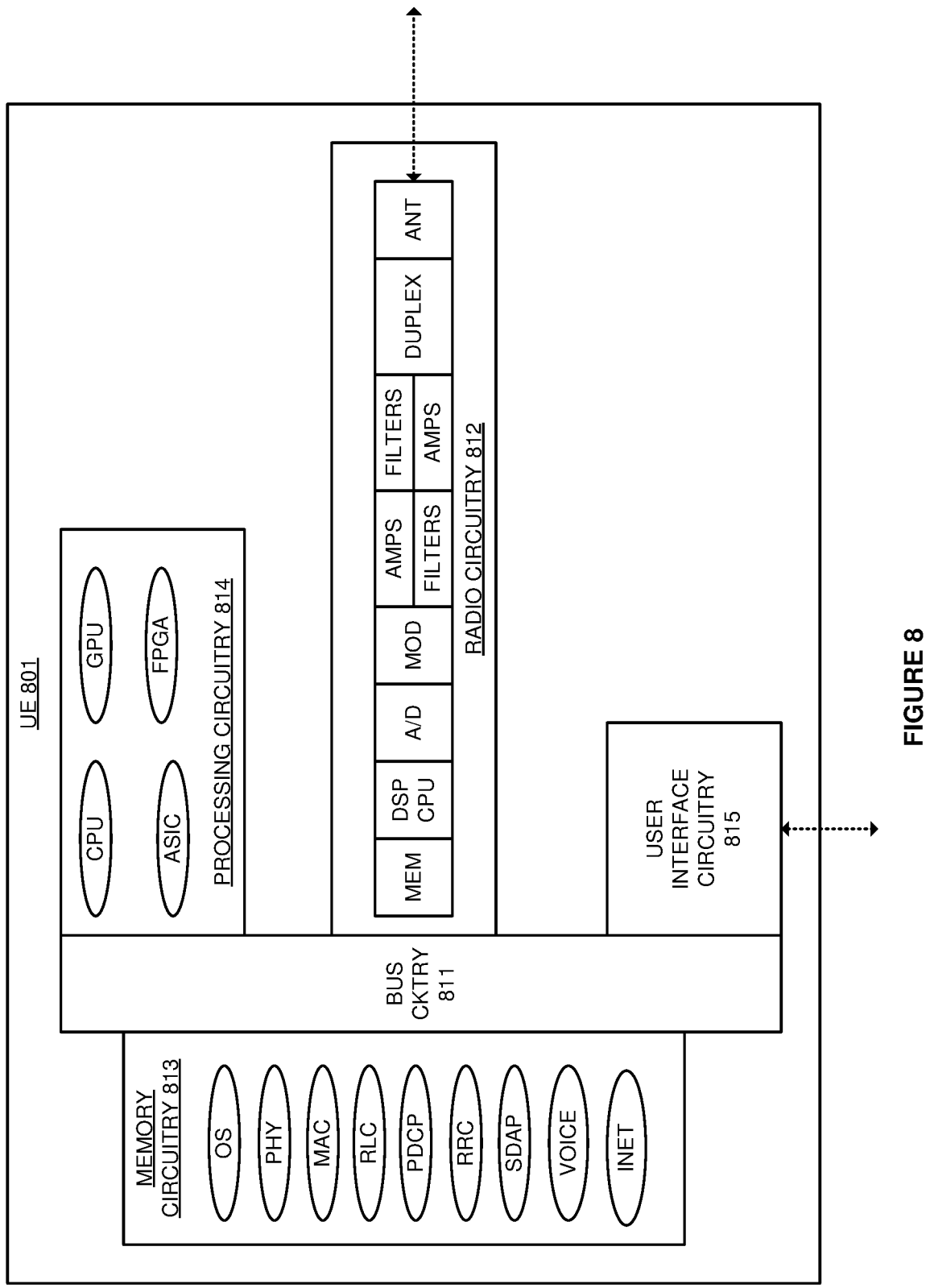
FIG. 8 illustrates a User Equipment (UE) that is served by a wireless data relay that controls its frequency channel usage.

FIG. 8 illustrates User Equipment (UE) 801 that is served by a wireless data relay that controls its frequency channel usage. UE 801 comprises bus circuitry 811, radio circuitry 812, memory circuitry 813, processing circuitry 814, and user interface circuitry 815. Bus circuitry 811 couples radio circuitry 812, memory circuitry 813, processing circuitry 814, and user interface circuitry 815. Memory circuitry 813 comprises volatile and non-volatile memories like flash, disc, tape, and the like. Memory circuitry 813 stores operating systems, network applications, voice user applications, and internet-access (INET) user applications. The network applications comprise PHY, MAC, RLC, PDCP, RRC, SDAP, and the like.

Processing circuitry 814 comprises CPUs, GPUs, ASICs, FPGAs and/or some other computer hardware. Processing circuitry 814 executes the operating systems, network applications, and user applications to drive radio circuitry 812 and user interface circuitry 815. User interface circuitry 815 comprises displays, speakers, microphones, transceivers, ports, and/or some other user component.

Radio circuitry 812 comprises antennas, duplexers, filters, amplifiers, modulators, A/D interfaces, DSP, CPU, and memory. The antennas in radio circuitry 812 exchange wireless data and signaling with wireless data relays. The DSP/CPUs execute firmware/software to drive the exchange of the data and signaling between the antennas and the radio memory. Processing circuitry 814 executes the operating systems and network applications to drive the exchange of data and signaling between the radio memory and memory circuitry 813.

The user voice and video applications generate voice/video data and signaling—typically by user interface circuitry 815 sensing voice/video data. The network applications process the application data and signaling to generate and store UL data and signaling in the radio memory. In radio circuitry 812, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the wireless data relays.

In radio circuitry 812, the antennas receive wireless Downlink (DL) signals from the wireless data relays and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs transfer the DL data and signaling to memory circuitry 813. The network applications process the DL data and signaling in memory circuitry 813 to generate voice/video data and application signaling. The voice and video applications process the voice/video data and application signaling—typically by user interface circuitry 815 presenting the voice/video data.

The wireless data network circuitry described above comprises computer hardware and software that form special-purpose wireless data relays that control the frequency channels that they use to communicate with wireless access networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless data relays that control the frequency channels that they use to communicate with wireless access networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless data relay that serves wireless data services to User Equipment (UEs), the method comprising:

radio circuitry wirelessly scanning a frequency band comprising frequency channels and wirelessly attaching to a wireless communication network over the frequency band;

the radio circuitry wirelessly receiving network signaling from the wireless communication network indicating allowed ones of the frequency channels and transferring the network signaling to control circuitry;

the control circuitry processing the network signaling and responsively directing the radio circuitry to use the allowed frequency channels instead of the frequency band;

the radio circuitry wirelessly scanning the allowed frequency channels instead of the frequency band and wirelessly re-attaching to the wireless communication network over the allowed frequency channels; and the radio circuitry wirelessly exchanging user data with the UEs and wirelessly exchanging the user data with the wireless communication network over the allowed frequency channels.

2. The method of claim 1 wherein the allowed frequency channels comprise a single downlink channel and a single uplink channel.

3. The method of claim 1 wherein the allowed frequency channels comprise Evolved Universal Terrestrial Radio Access Absolute Radio Channel Numbers (EARFCNs).

4. The method of claim 1 wherein the allowed frequency channels comprise a single downlink Evolved Universal Terrestrial Radio Access Absolute Radio Channel Number (EARFCN) and a single uplink EARFCN.

5. The method of claim 1 wherein the network signaling comprises a channel lock flag and a channel list and the control circuitry processing the network signaling and directing the radio circuitry to use the allowed frequency channels instead of the frequency band comprises the control circuitry detecting the channel lock flag and responsively processing the allowed channel list to identify the allowed frequency channels.

6. The method of claim 1 wherein the wireless communication network comprises a wireless access point that serves the wireless data relay and further comprising:

the control circuitry generating additional network signaling indicating the allowed frequency channels;

the radio circuitry transferring the additional network signaling to the wireless access point; and wherein the radio circuitry wirelessly exchanging the user data with the wireless communication network over the allowed frequency channels comprises the radio circuitry wirelessly exchanging the user data with the wireless access point using Carrier Aggregation (CA) over the allowed frequency channels.

7. The method of claim 1 wherein the radio circuitry wirelessly scanning the frequency band, wirelessly attaching to the wireless communication network over the frequency band, and wirelessly receiving the network signaling from the wireless communication network indicating the allowed frequency channels comprises the radio circuitry powering-up, and in response, the radio circuitry wirelessly scanning the frequency band, wirelessly attaching to the wireless communication network over the frequency band, and wirelessly receiving the network signaling from the wireless communication network indicating the allowed frequency channels.

8. The method of claim 1 wherein the radio circuitry wirelessly attaching to the wireless communication network comprises the radio circuitry transferring a geographic location of the wireless data relay to the wireless communication network.

9. The method of claim 1 wherein the radio circuitry wirelessly attaching to the wireless communication network comprises the radio circuitry transferring wireless scan measurements to the wireless communication network.

10. The method of claim 1 wherein the wireless communication network transfers the network signaling indicating allowed frequency channels to the wireless data relay in response to radio interference in the frequency band.

11. A wireless data relay that serves wireless data services to User Equipment (UEs), the wireless data relay comprising:

radio circuitry configured to wirelessly scan a frequency band comprising frequency channels and wirelessly attach to a wireless communication network over the frequency band;

the radio circuitry configured to wirelessly receive network signaling from the wireless communication network indicating allowed ones of the frequency channels and transfer the network signaling to control circuitry;

the control circuitry configured to process the network signaling and responsively direct the radio circuitry to use the allowed frequency channels instead of the frequency band;

the radio circuitry configured to wirelessly scan the allowed frequency channels instead of the frequency band and wirelessly re-attach to the wireless communication network over the allowed frequency channels; and the radio circuitry configured to wirelessly exchange user data with the UEs and wirelessly exchange the user data with the wireless communication network over the allowed frequency channels.

12. The wireless data relay of claim 11 wherein the allowed frequency channels comprise a single downlink channel and a single uplink channel.

13. The wireless data relay of claim 11 wherein the allowed frequency channels comprise Evolved Universal Terrestrial Radio Access Absolute Radio Channel Numbers (EARFCNs).

14. The wireless data relay of claim 11 wherein the allowed frequency channels comprise a single downlink Evolved Universal Terrestrial Radio Access Absolute Radio Channel Number (EARFCN) and a single uplink EARFCN.

15. The wireless data relay of claim 11 wherein the network signaling comprises a channel lock flag and a channel list and the control circuitry configured to detect the channel lock flag and responsively process the allowed channel list to identify the allowed frequency channels.

16. The wireless data relay of claim 11 wherein the wireless communication network comprises a wireless access point that serves the wireless data relay and further comprising:

the control circuitry configured to generate additional network signaling indicating the allowed frequency channels;

the radio circuitry configured to transfer the additional network signaling to the wireless access point; and wherein the radio circuitry is configured to wirelessly exchange the user data with the wireless access point using Carrier Aggregation (CA) over the allowed frequency channels.

17. The wireless data relay of claim 11 wherein the radio circuitry is configured to power-up, and in response, to wirelessly scan the frequency band, wirelessly attach to the wireless communication network over the frequency band, and wirelessly receive the network signaling from the wireless communication network indicating the allowed frequency channels.

18. The wireless data relay of claim 11 wherein the radio circuitry is configured to transfer a geographic location of the wireless data relay to the wireless communication network.

19. The wireless data relay of claim 11 wherein the radio circuitry is configured to transfer wireless scan measurements to the wireless communication network.

20. The wireless data relay of claim 11 wherein the wireless communication network is configured to transfer the network signaling indicating allowed frequency channels to the wireless data relay in response to radio interference in the frequency band.

* * * * *